(No Model.)
G. W. SOWLES.
CAR COUPLING.
No. 298,319. Patented May 6, 1884.
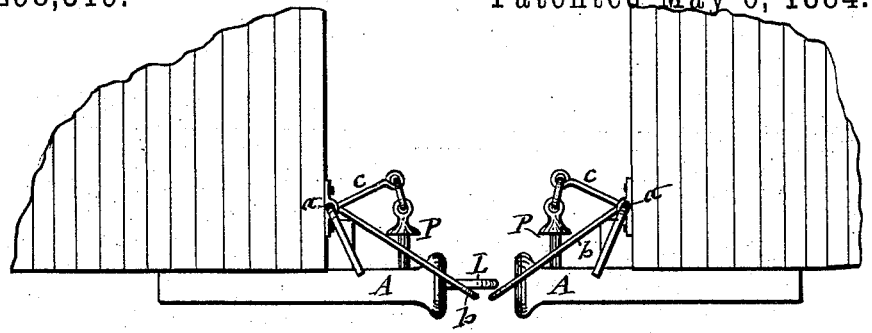
FIG-I-
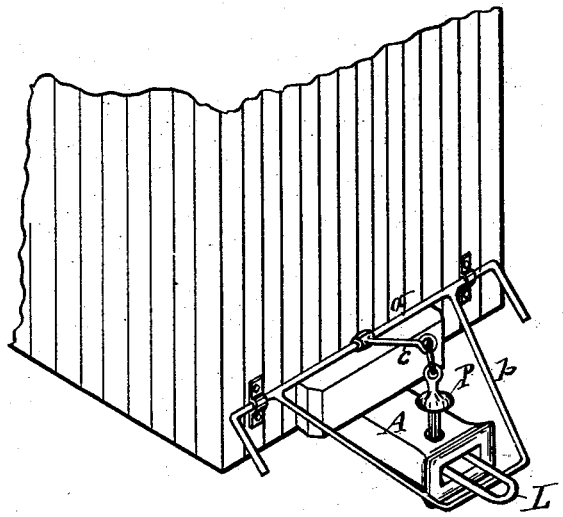
FIG-II-
WITNESSES
C. Bendixon
Wm. C. Raymond
INVENTOR
George W. Sowles
per Duell, Lass & Hey
his Attys

UNITED STATES PATENT OFFICE.

GEORGE W. SOWLES, OF CHITTENANGO, NEW YORK.

CAR-COUPLING.

SPECIFICATION forming part of Letters Patent No. 298,319, dated May 6, 1884.

Application filed March 25, 1884. (No model.)

*To all whom it may concern:*

Be it known that I, GEORGE W. SOWLES, of Chittenango, in the county of Madison, in the State of New York, have invented new and useful Improvements in Car-Couplings, of which the following, taken in connection with the accompanying drawings, is a full, clear, and exact description.

This invention relates to the class of car-couplings which are designed to guide the ordinary coupling-link into the mouth of the ordinary draw-bar for connecting with the coupling-pin sustained temporarily from dropping into the link; and the invention consists in certain novel, simple, and efficient devices for effecting the coupling of railroad-cars, as hereinafter more fully described.

In the accompanying drawings, Figure 1 is a side view of the approaching ends of two cars provided with my improved coupling. Fig. 2 is a perspective view of the car-coupler in its operative position.

A represents the ordinary draw-bar, formed with the usual bell-shaped mouth for the reception of the ordinary coupling-link, L, and P represents the ordinary coupling-pin used in connection with the link L. In connection with the aforesaid coupling link and pin I employ the following instrumentalities for guiding and manipulating the same: Across the ends of the car is arranged a lever, a, provided on its ends with suitable handles by which to turn it on its axis. From said lever is extended a bail, b, which is rigidly attached thereto, and reaches under the end of the draw-bar, and is adapted to rise in the front thereof. To the center of the lever a, I rigidly attach an arm, c, the free end of which is connected with the coupling-pin P. By turning the lever a the bail is raised in front of the draw-bar A, and lifts the coupling-link L and sustains the same in position for entering the mouth of the draw-bar of the approaching car. Simultaneously with the guiding of the link L, as aforesaid, the arm c is caused to raise the pin P, so as to liberate the link L. The coupling of both cars being thus set allows the link L to enter the mouth of the draw-bar A, and in the approach of the two cars the ends of the draw-bars encounter the intervening portion of the bail b and press the same downward and out of the way, so as to allow the two draw-bars to meet and the coupling-link L to enter into the draw-bars, and in entering the same the pin P is caused to drop into the link by the depression of the bail B, which throws the lever a so as to carry down the arm c. It will thus be observed that the train-man is enabled to effect the coupling without going between the cars.

What I claim as my invention is—

In combination with the common draw-bar, coupling link and pin, the pivoted lever a, extended across the end of the car, the bail b, fixed to said lever and reaching under the end of the draw-bar, and the arm c, projecting from the lever and connected with the pin, all constructed and combined substantially in the manner shown.

In testimony whereof I have hereunto signed my name and affixed my seal, in the presence of two attesting witnesses, at Syracuse, in the county of Onondaga, in the State of New York, this 14th day of March, 1884.

GEORGE W. SOWLES. [L. S.]

Witnesses:
 FREDERICK H. GIBBS,
 C. BENDIXON.